United States Patent
Brodbeck

(10) Patent No.: US 10,436,624 B2
(45) Date of Patent: Oct. 8, 2019

(54) WATER LEVEL MONITORING FOR MULTIPLE WATER TANKS OF SEWER CLEANING VEHICLE

(71) Applicant: Federal Signal Corporation, Oak Brook, IL (US)

(72) Inventor: Jared James Brodbeck, Metamora, IL (US)

(73) Assignee: Federal Signal Corporation, Oak Brook, IL (US)

( * ) Notice: Subject to any disclaimer, the term of this patent is extended or adjusted under 35 U.S.C. 154(b) by 149 days.

(21) Appl. No.: 15/684,689

(22) Filed: Aug. 23, 2017

(65) Prior Publication Data
US 2019/0063978 A1    Feb. 28, 2019

(51) Int. Cl.
| | | |
|---|---|---|
| *G01F 23/14* | (2006.01) | |
| *E03F 7/10* | (2006.01) | |
| *E03F 9/00* | (2006.01) | |
| *B08B 9/035* | (2006.01) | |
| *B08B 9/032* | (2006.01) | |

(52) U.S. Cl.
CPC ............. *G01F 23/14* (2013.01); *E03F 7/10* (2013.01); *E03F 9/007* (2013.01); *B08B 9/035* (2013.01); *B08B 9/0321* (2013.01)

(58) Field of Classification Search
CPC .. E03F 7/10; E03F 7/103; G01F 23/18; G01F 23/185; G01F 23/20; G01F 23/14
See application file for complete search history.

(56) References Cited

U.S. PATENT DOCUMENTS

| | | | | |
|---|---|---|---|---|
| 4,234,980 | A * | 11/1980 | DiVito | E03F 7/10 134/168 C |
| 4,446,730 | A * | 5/1984 | Smith | G01F 23/18 73/301 |
| D344,162 | S | 2/1994 | Kimes | |
| 6,131,062 | A | 10/2000 | Nielsen | |
| 6,673,577 | B1 | 1/2004 | Rothberg et al. | |
| 6,681,551 | B1 | 1/2004 | Sheidler et al. | |
| 6,694,240 | B1 | 2/2004 | Swick et al. | |
| 6,792,646 | B1 | 9/2004 | Greene et al. | |
| 8,881,341 | B2 | 11/2014 | Schmidt, Jr. | |
| 9,134,163 | B2 * | 9/2015 | Horst | G01F 23/14 |
| 9,528,259 | B2 | 12/2016 | Bossom | |
| 9,534,945 | B2 * | 1/2017 | Vander Horst | G01F 23/14 |

\* cited by examiner

*Primary Examiner* — Justin N Olamit
(74) *Attorney, Agent, or Firm* — Merchant & Gould P.C.

(57) ABSTRACT

A sewer cleaning vehicle includes a monitoring device for detecting a water level in a plurality of water tanks using a sensor engaged with the water tanks. The vehicle can present to an operator the water level together with operational conditions of the vehicle. The vehicle can continuously fill the water tanks based on the water level, and inform the operator of the water tanks having a water level lower than a user-configurable threshold.

20 Claims, 14 Drawing Sheets

| Height (inches) | Percent Fill (%) | | | Tank Capacity/(Gallons) | | | |
|---|---|---|---|---|---|---|---|
| | Tank Set 1 | Tank Set 2 | Tank Set 3 | Tank Set 1 | Tank Set 2 | Tank Set 3 | Total |
| | | | | 368 | 606 | 0 | 974 |

| Height (inches) | Percent Fill (%) | | | Volume Fill (Gallons) | | | Total Percent Fill (%) |
|---|---|---|---|---|---|---|---|
| | Tank Set 1 | Tank Set 2 | Tank Set 3 | Tank Set 1 | Tank Set 2 | Tank Set 3 | |
| 0 | 1.1348 % | 0 % | 0 % | 4.176064 | 0 | 0 | 0.42875 % |
| 1 | 3.1700 % | 0 % | 0 % | 11.665600 | 0 | 0 | 1.19770 % |
| 2 | 5.7586 % | 0 % | 0 % | 21.191648 | 0 | 0 | 2.17573 % |
| ... | ... | ... | ... | ... | ... | ... | ... |
| 31 | 100 % | 0 % | 5.3333 % | 368 | 0 | 0 | 37.78234 % |
| 32 | 100 % | 0 % | 10.6667 % | 368 | 0 | 0 | 37.78234 % |
| 33 | 100 % | 0 % | 16.0000 % | 368 | 0 | 0 | 37.78234 % |
| ... | ... | ... | ... | ... | ... | ... | ... |
| 61 | 100 % | 96.8300 % | 100 % | 368 | 586.789800 | 0 | 98.02770 % |
| 62 | 100 % | 98.8683 % | 100 % | 368 | 599.141898 | 0 | 99.29588 % |
| 63 | 100 % | 100 % | 100 % | 368 | 606 | 0 | 100 % |

*FIG. 8*

WATER LEVEL MONITORING FOR MULTIPLE WATER TANKS OF SEWER CLEANING VEHICLE

BACKGROUND

Sewer pipes can be cleaned using a sewer cleaning vehicle, such as a sewer cleaning truck, which can perform jetting and vacuuming. Jetting is a process in which a high-pressure water hose with a sewer-jetting nozzle is pushed into pipelines. High-pressure water is released from a water tank of a sewer cleaning vehicle to dislodge dirt and flush it away into a hose. As the dirt is removed, the nozzle continues to move deeper into the sewer. A sewer cleaning vehicle also uses vacuuming through which the dirt is extracted with a vacuuming system. All the solids and water removed are then disposed into a sludge tank.

Some sewer cleaning vehicles include multiple water tanks for containing and releasing water through a hose with a nozzle. Such water tanks may have different water levels at a particular time due to different water consumptions from the tanks. Further, the water tanks may have different dimensions due to, for example, design requirements or space limitation. As a result, the relationship between water height and water level (e.g., percent fill) is not typically linear. Some systems simply use a linear conversion between water height and water level, thereby causing inaccurate reading. It is therefore desired to accurately monitor and display water levels of multiple water tanks which have different water levels and/or different dimensions.

SUMMARY

In general terms, the present disclosure relates to a sewer cleaning vehicle. In one possible configuration and by non-limiting example, the sewer cleaning vehicle includes a monitoring device configured to detect water levels in a plurality of water tanks and present to an operator the water levels along with operational conditions of the vehicle. Various aspects are described in this disclosure, which include, but are not limited to, the following aspects.

One aspect is a sewer cleaning vehicle including a vehicle bed, a debris tank, a water pump, a plurality of water tanks, a sensor, and a monitoring device. The debris tank is configured to collect debris from a sewer pipe. The water tanks are in fluid communication with one another and have a single outlet connected to the water pump. The water pump is configured to supply water from the plurality of water tanks. The sensor is engaged with the plurality of water tanks and configured to measure a water height in the plurality of water tanks. The monitoring device includes a water level monitoring module configured to calculate a water level in the plurality of water tanks based on the water height. The monitoring device may further include a display device configured to display the water level.

In certain examples, the water level monitoring module is configured to obtain a lookup table for the plurality of water tanks, and calculate the water level based on the lookup table and the water height.

In certain examples, the water level is represented as a single value. The single value may be a percent value.

In certain examples, the water level is displayed in the display device along with operational conditions of the vehicle.

In certain examples, the sensor includes a pressure sensor.

In certain examples, at least one of the plurality of water tanks has a different dimension than the other water tanks. In certain examples, at least one of the plurality of water tanks is arranged at a different level than the other water tanks.

In certain examples, the monitoring device is configured to determine whether the water level is below a fill start threshold, and upon determining that the water level is below the fill start threshold, operate to fill the plurality of water tanks with water. In certain examples, the monitoring device is configured to receive a user input of the fill start threshold.

In certain examples, the monitoring device is configured to: determine whether the water level is above a fill end threshold, and upon determining that the water level is above the fill end threshold, operate to stop filling the plurality of water tanks with water. In certain examples, the monitoring device is configured to receive a user input of the fill end threshold.

In certain examples, the monitoring device is configured to determine whether the water level is below a low water threshold, and upon determining that the water level is below the low water threshold, generate a notification to inform an operator that the water level is below the low water threshold. In certain examples, the monitoring device is configured to receive a user input of the low water threshold. In certain examples, the notification is displayed in a display device of the monitoring device.

Another aspect is a method for monitoring water volumes in a plurality of water tanks mounted in a sewer cleaning vehicle. The method includes obtaining a lookup table the plurality of water tanks; monitoring a water height in the plurality of water tanks; calculating a water level based on the lookup table and the water height; and displaying the water level using a display device.

In certain examples, the water level is represented as a single percent value.

In certain examples, monitoring a water height includes monitoring a water pressure in the plurality of water tanks using a pressure sensor; and calculating the water height based on the water pressure.

In certain examples, the method may further include determining whether the water level is below a fill start threshold; upon determining that the water level is below the fill start threshold, operating to fill the plurality of water tanks with water; determining whether the water level is above a fill end threshold; upon determining that the water level is above the fill end threshold, operating to stop filling the plurality of water tanks with water; determining whether the water level is below a low water threshold; and upon determining that the water level is below the low water threshold, generating a notification to inform an operator that the water level is below the low water threshold.

In certain examples, the method may further include receiving a user input of the fill start threshold, the fill end threshold, and the low water threshold.

BRIEF DESCRIPTION OF THE DRAWINGS

FIG. 8 illustrates an example lookup table that is used to calculate the water level from the water height.

DETAILED DESCRIPTION

Figure 1:
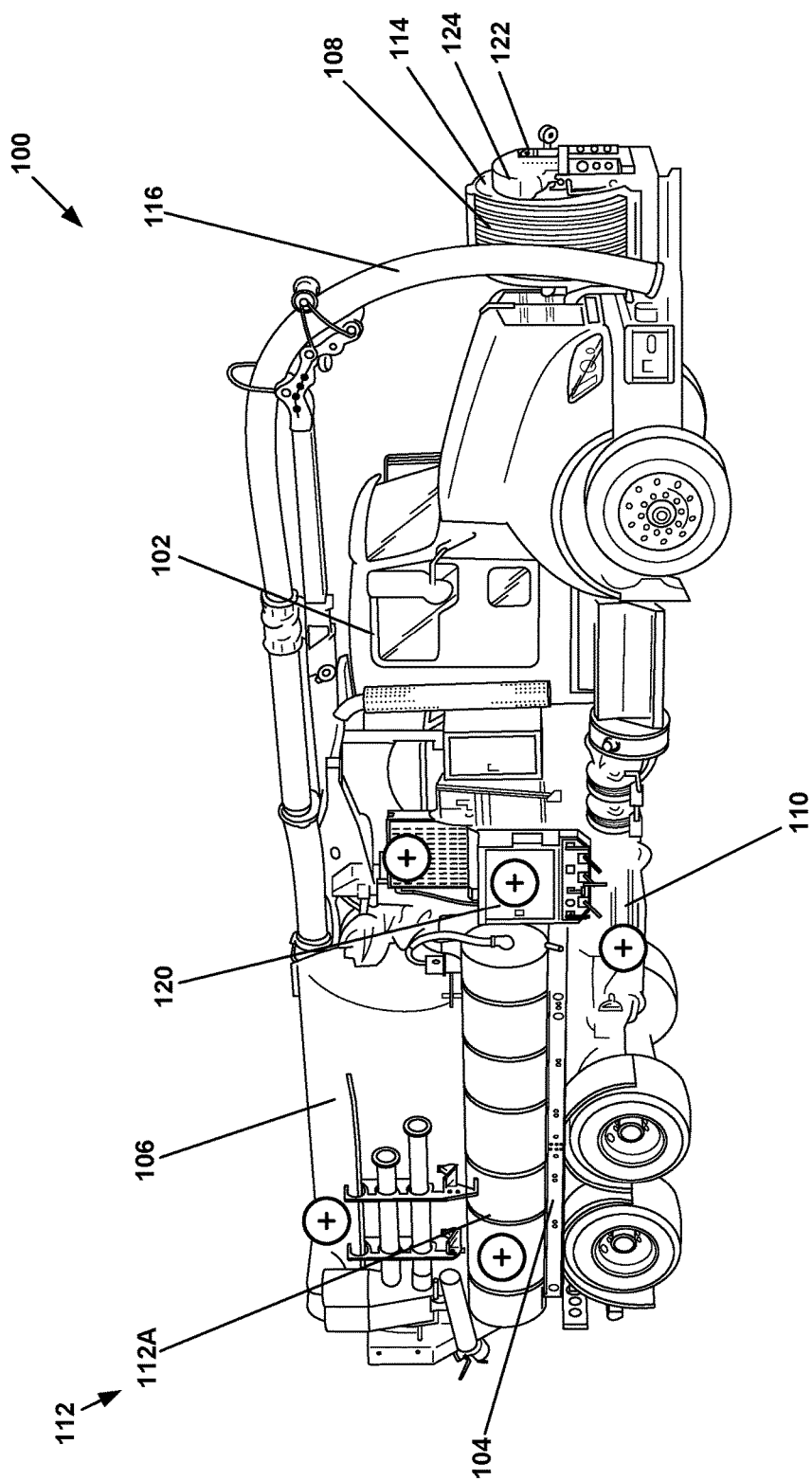
FIG. 1 is a perspective view of an exemplary embodiment of a sewer cleaning vehicle in accordance with the present disclosure.

Various embodiments will be described in detail with reference to the drawings, wherein like reference numerals represent like parts and assemblies throughout the several views.

Figure 2:
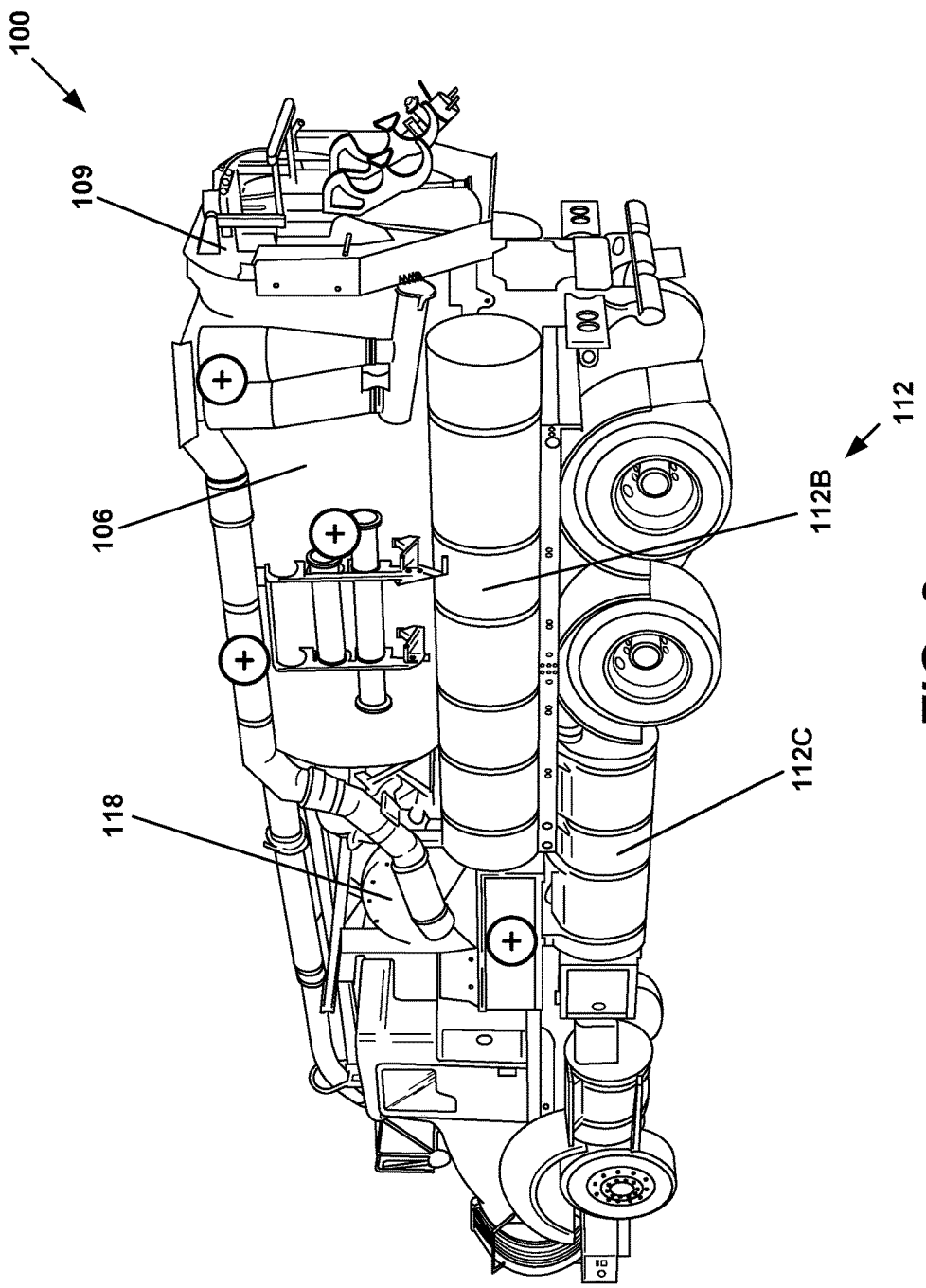
FIG. 2 is another perspective view of the sewer cleaning vehicle of FIG. 1.
Figure 3:
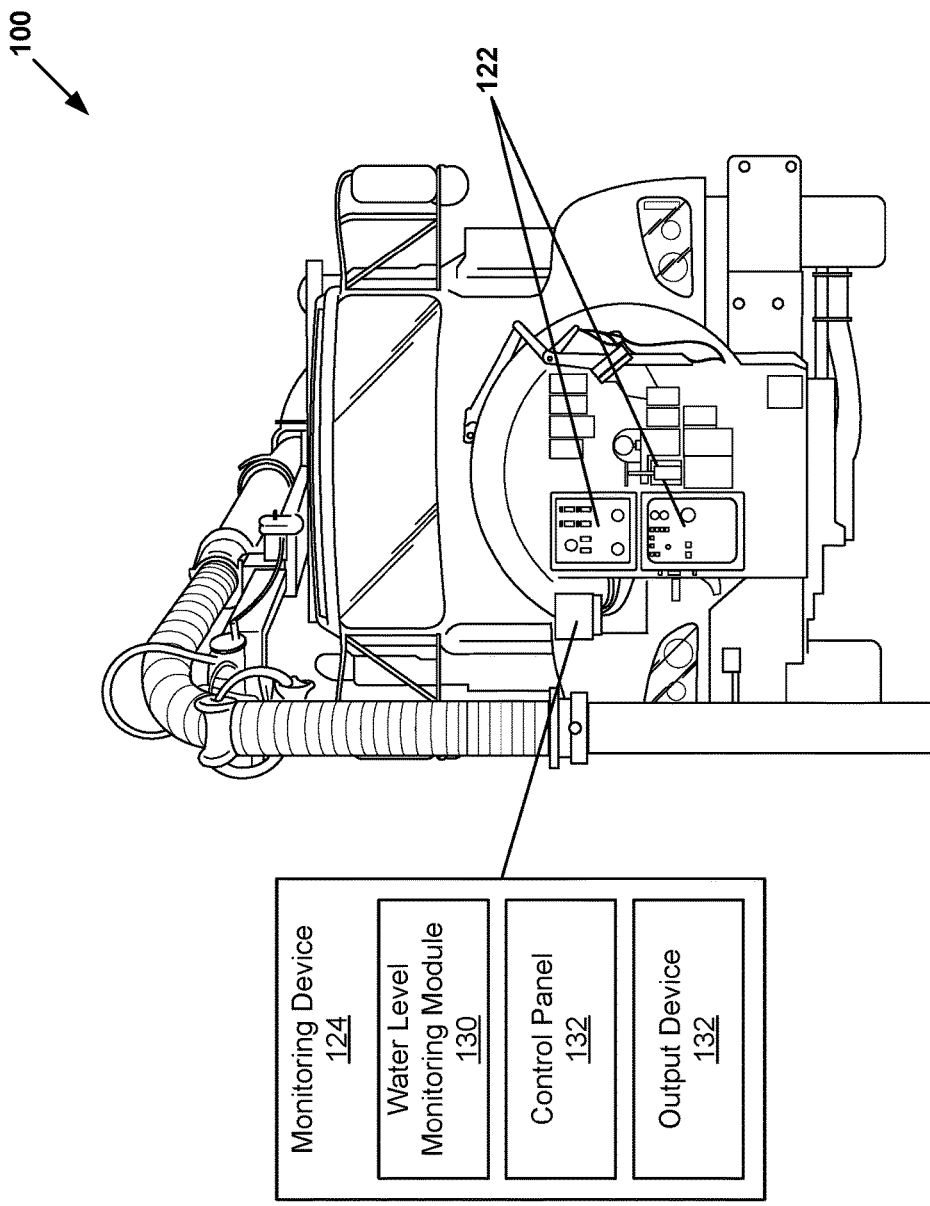
FIG. 3 is a front perspective view of the sewer cleaning vehicle of FIG. 1.

FIGS. 1-3 illustrate an exemplary embodiment of a sewer cleaning vehicle in accordance with the present disclosure. The sewer cleaning vehicle is generally designated by reference numeral 100. In this embodiment, the sewer cleaning vehicle 100 is configured as a truck that is capable of providing jetting and vacuuming.

The sewer cleaning vehicle 100 includes a cab 102 and a bed 104 extending rearwards from the cab 102. A debris tank 106 is mounted to the bed 104. The debris tank 106 is used to collect debris or sludge removed from the sewer pipes being cleaned. In some examples, the debris tank 106 is pivotally mounted to the bed 104 adjacent the rear of the bed 104 such that the front of the debris tank 106 lifts off of the bed 104 and is tilted for dumping the debris collected in the debris tank 106. The rear end of the debris tank 106 includes a pivotally mounted door 109 coupled to the remainder of the debris tank 106.

At least one high pressure hose 108 is coupled at one end to a high pressure water pump 110. The other end of the hose 108 has a nozzle for high velocity spraying into sewer pipes to be cleaned. The water pump 110 supplies water from one or more water tanks 112 to the hose 108. The hose 108 can be mounted to a reel 114. In some examples, the reel 114 is arranged at the front of the vehicle 100. A vacuum hose 116 can be located adjacent the hose 108. An end of the vacuum hose 116 is fluidly coupled to the debris tank 106, and the other end of the vacuum hose 116 is configured to extend down into a desired pipe to be cleaned. A vacuum pump 118 is provided at the vehicle 100 and configured to create a negative pressure inside of the debris tank 106. In some embodiments, water or another fluid can be used to help the vacuum pump 118 create a seal and form the vacuum. Water sprayed inside the sewer pipe being cleaned through the nozzle of the hose 116 is sucked up with debris from the pipe through the vacuum hose 116 and deposited into the debris tank 106.

The water pump 110 operates to pump water from at least one of the water tanks 112. The water pump 110 can have various configurations, such as a dual acting, single piston pump, an example of which is a Vactor Jet Rodder pump, available from Vactor Manufacturing, Streator, Ill.

The water tanks 112 are mounted to the vehicle 100 and configured to contain water for cleaning sewer pipes. In some embodiments, a plurality of water tanks 112 (including 112A, 112B, 112C) is provided for higher water capacity of the vehicle. The water tanks 112 can be arranged in the vehicle 100 in various configurations, depending on various considerations, such as for ease of use or optimal weight distribution. In some embodiments, at least one of the water tanks 112 is configured to have a different dimension than the other water tanks 112. Different dimensions of water tanks 112 may or may not have a same capacity. In other embodiments, all the water tanks 112 are configured to have an identical dimension having a same capacity. In addition, at least one of the water tanks 112 can be arranged at a different level than the other water tanks 112. Example configurations of water tanks are illustrated with reference to FIGS. 4A-4D.

The water tanks 112 can be made of various materials. In one example, the water tanks 112 are made of aluminum for corrosion resistance and weight reduction.

In some embodiments, at least some of the water tanks 112 are in fluid communication. In other embodiments, all of the water tanks 112 are in fluid communication so that the entire group of water tanks 112 operates as a single water tank or single water supply. Fluidic connection between some or all of the water tanks 112 is further described with reference to FIGS. 4A-4D.

The vehicle 100 can further include an emergency stop interface 120 that provides an interface for an operator to disable one or more elements and devices of the vehicle 100. In some embodiments, the emergency stop interface 120 is configured to enable an operator to stop at least one of the water pump, vacuuming function, and hydraulic functions, and to return the chassis engine to idle so that the unit comes to a safe condition without stopping the engine.

In some examples, the vehicle 100 includes a control interface 122 that provides control elements for operating and controlling various elements and devices of the vehicle 100. In this example, the control interface 122 is arranged at the front of the vehicle 100 to make it convenient to operate. The control interface 122 can include physical control elements, such as buttons, switches, levers, selectors, and joysticks. In other examples, the control interface 122 includes electronic control elements. For example, the control interface 122 can be integrated with a display device, such as a touch sensitive display screen, and include graphical user interface control elements or widgets.

The vehicle 100 can include a monitoring device 124 configured to enable an operator to access various operational information. Examples of such operational information include water flow, pressure, engine speed, vacuum system speed, hose footage, and maintenance information. In some examples, the monitoring device 124 operates to diagnose fault codes and warn the operator when an unsafe condition occurs. The monitoring device 124 can include a safety interlock circuit which ensures proper sequencing of functions to prevent an accidental misuse of equipment, thereby protecting the system and the operator. The monitoring device 124 can further include a diagnostic circuit that allows the operator to perform, or automatically performs, troubleshooting issues.

As discussed herein, the monitoring device 124 of the present disclosure further includes a water level monitoring module 130 that operates to monitor water levels of the plurality of water tanks 112 and inform the operator of the water levels so that the operator can conveniently access the total water level information for multiple water tanks. In some embodiments, the water level monitoring module 130 operates to generate and present a single value (e.g., a percentage) that represents the entire water level of the multiple water tanks.

In some examples, the monitoring device 124 includes a control panel 132 configured to receive a user input for operating the monitoring device 124 and accessing the information provided by the monitoring device 124. The control panel 132 can include physical control elements, such as buttons, switches, levers, selectors, and joysticks. In other examples, the control panel 132 includes electronic control elements, which can be integrated with a display device, such as a touch sensitive display screen, and include graphical user interface control elements or widgets.

Figure 10:
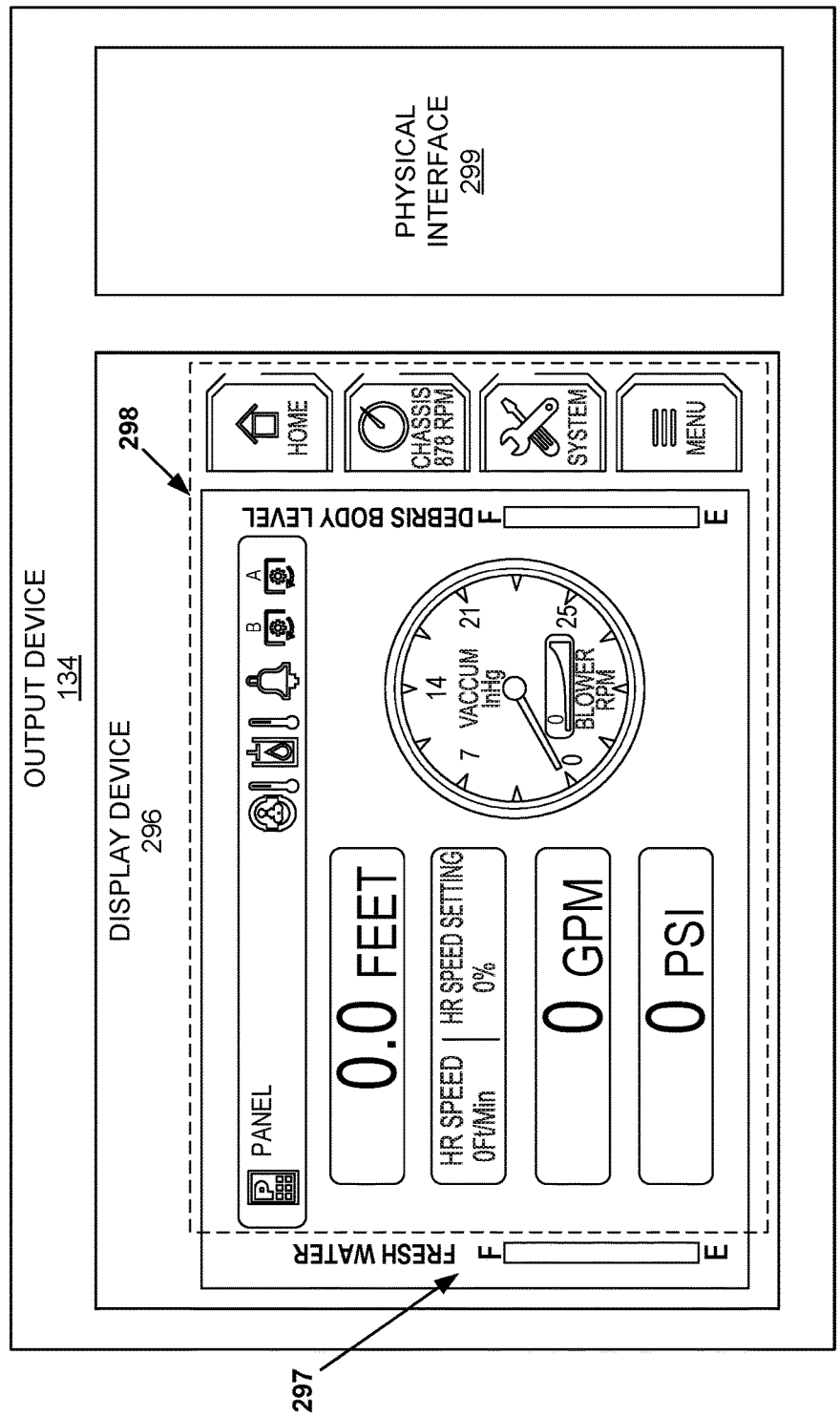
FIG. 10 illustrates an example of the output device.

The monitoring device 124 can further include an output device 134 configured to present the operational information (including water levels) to the operator. One example of the output device 134 includes a display device. In some embodiments, a single value (e.g., a percentage) representative of the water level of the multiple water tanks is presented on the display device, as illustrated in FIG. 10.

Figure 6:
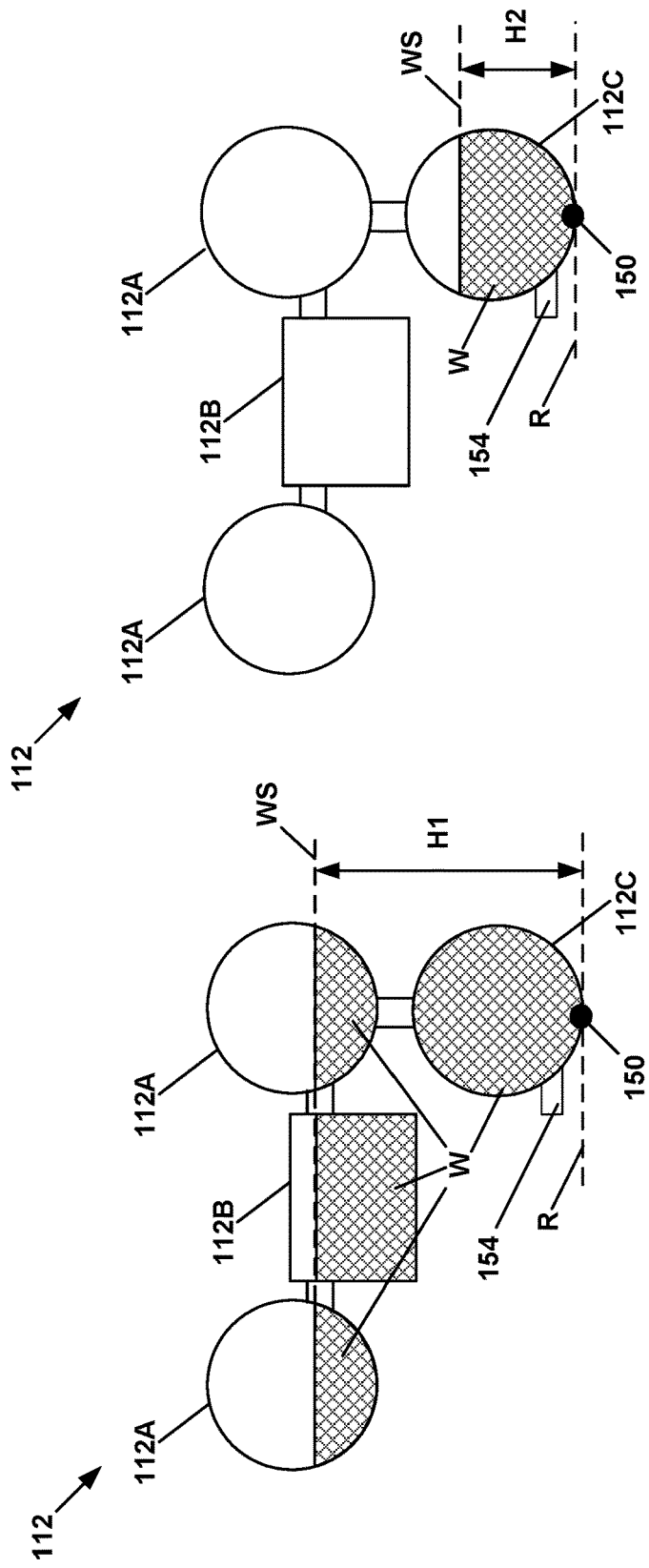
FIG. 6A illustrates a water height in a group of water tanks.
FIG. 6B illustrates another water height in the group of water tanks of FIG. 6A.

An example of the monitoring device 124 including the water level monitoring module 130, the control panel 132, and the output device 134 is described and illustrated in more detail with reference to FIG. 6.

In some examples, the monitoring device 124 is arranged adjacent the control interface 122 so that the operator conveniently manipulate various functions of the system at the same place. In the illustrated example, the monitoring device 124 and the control interface 122 are arranged at the front of the vehicle 100. In other examples, the monitoring device 124 is integrally configured with the control interface 122. For example, the control interface 122 is incorporated with the control panel 132 of the monitoring device 124 and/or with the display device 240 (such as a touch sensitive display screen) of the monitoring device 124.

FIGS. 4A-4D illustrate different example configurations of water tanks 112. As illustrated, in some embodiments, at least one of the water tanks 112 is configured to have a different dimension (e.g., shape and/or capacity) than the other water tanks 112. In other embodiments, all the water tanks 112 are configured to have an identical dimension with a same capacity.

Figure 4A:
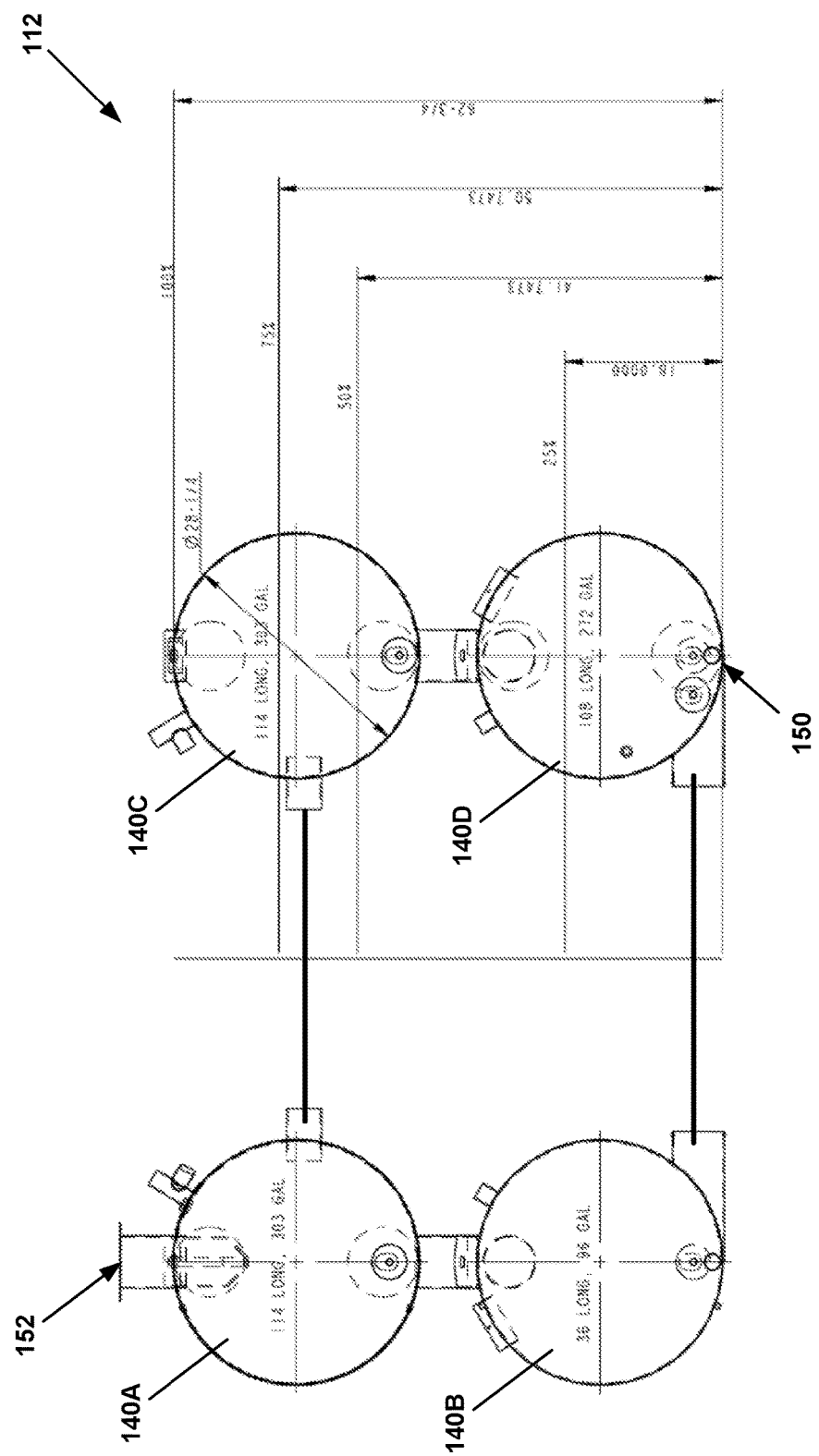
FIG. 4A illustrates an example configuration of water tanks.
Figure 4B:
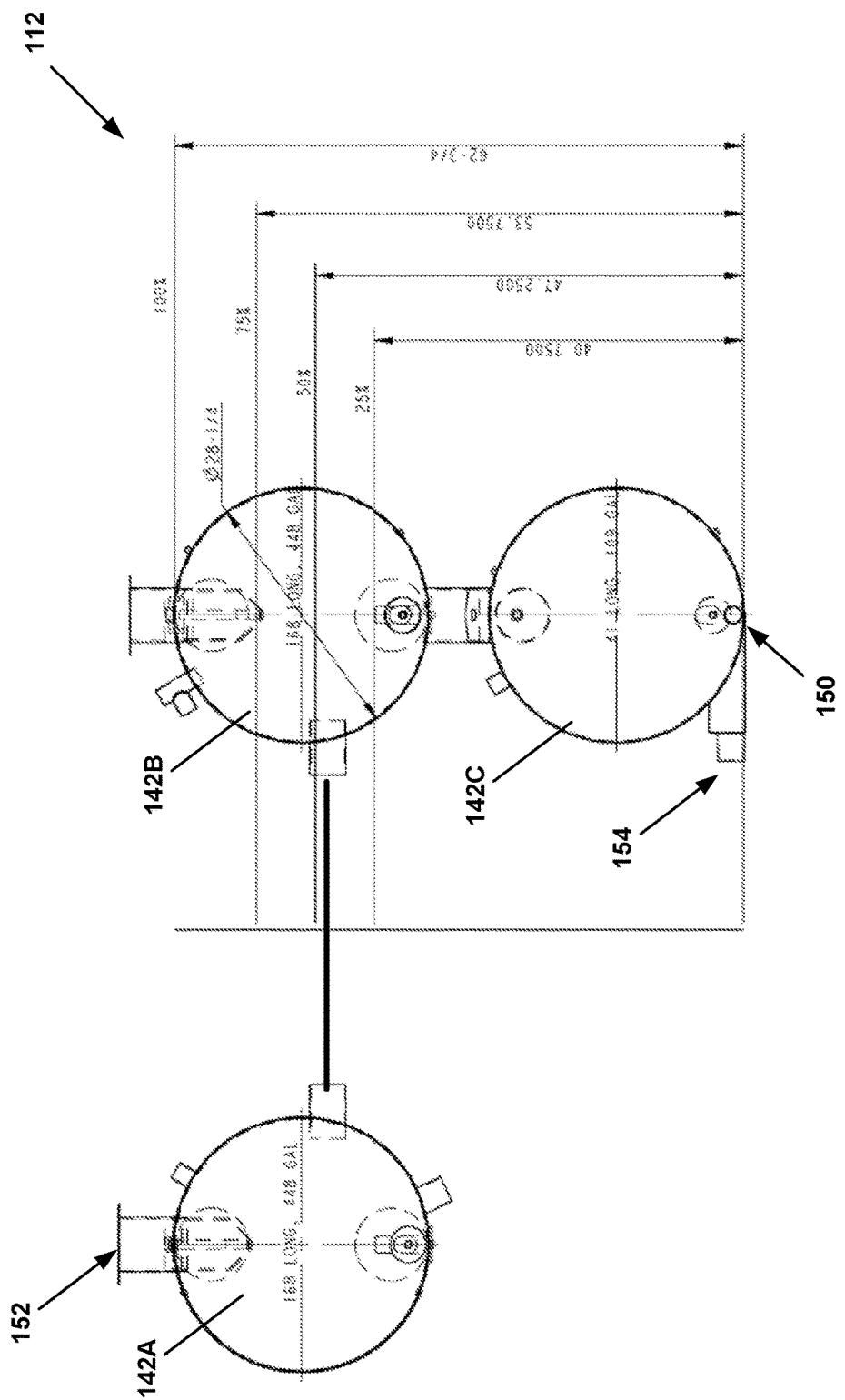
FIG. 4B illustrates another example configuration of water tanks.
Figure 4C:
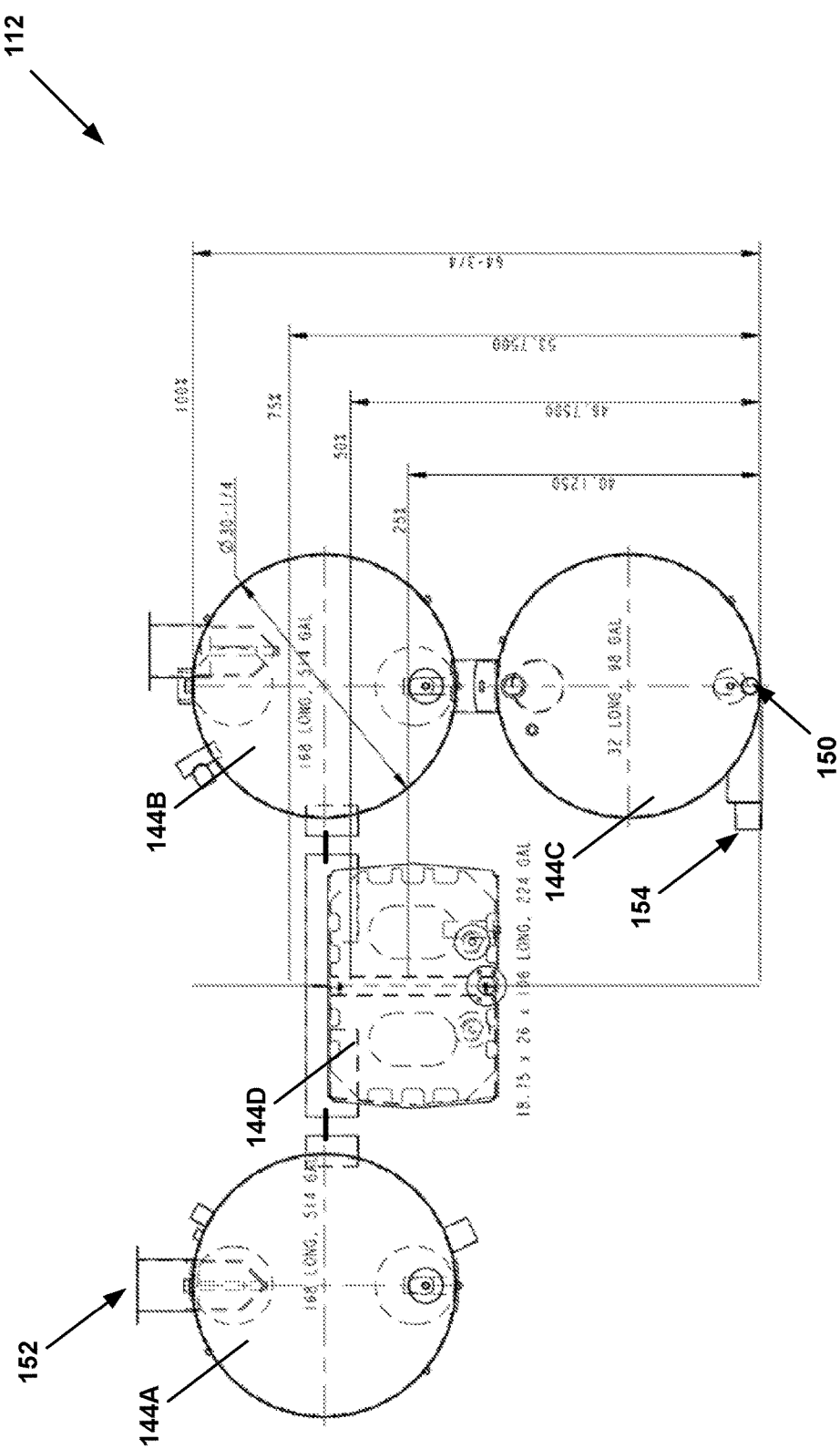
FIG. 4C illustrates yet another example configuration of water tanks.
Figure 4D:
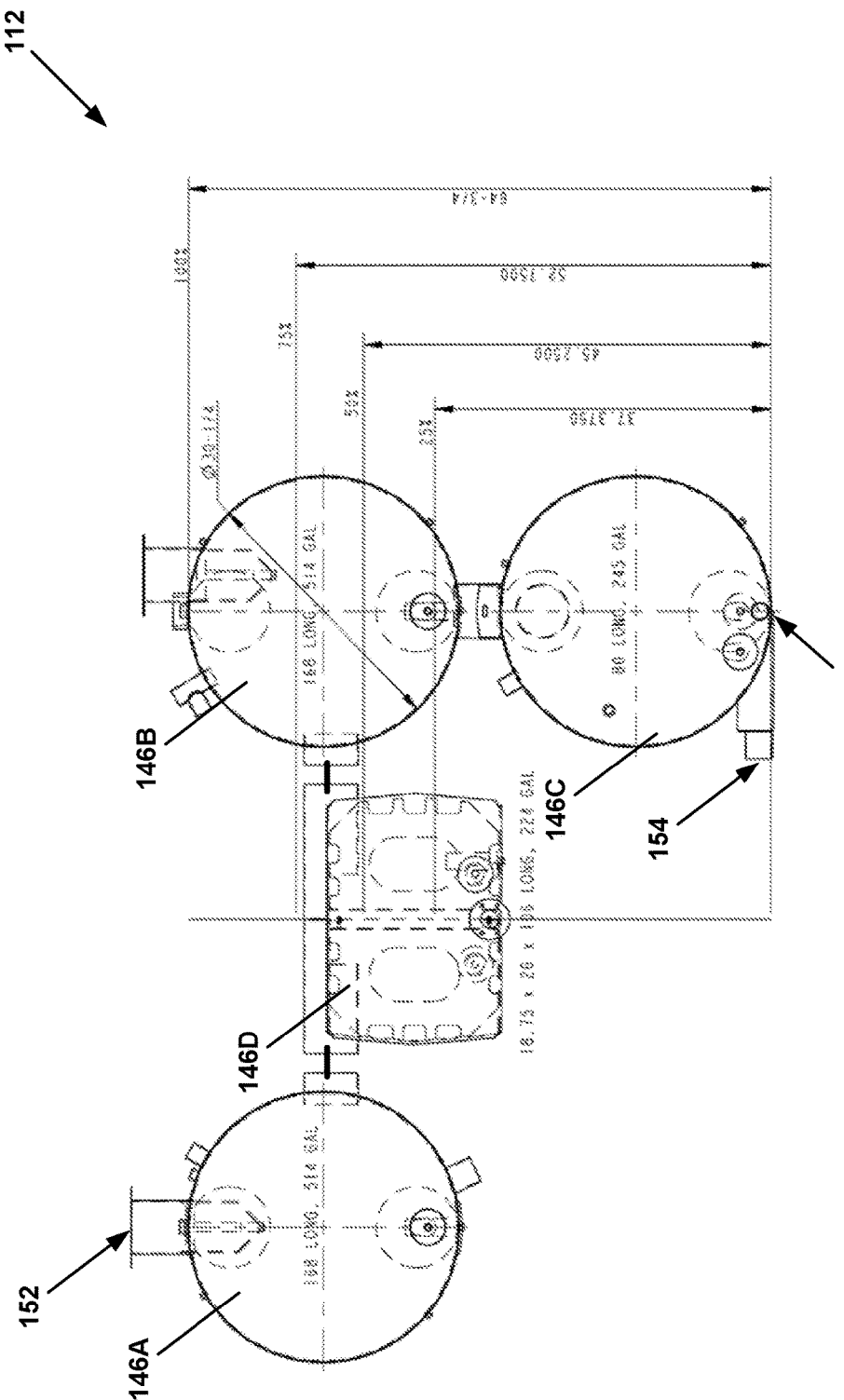
FIG. 4D illustrates yet another example configuration of water tanks.

In one example as shown in FIG. 4A, a set of water tanks 112 includes four water tanks 140A-D, which are arranged in two rows and two columns. All of the water tanks 140A-D can have the same circular cross sectional shape while at least one of the axial lengths can be different, thereby having different capacities. In another example as shown in FIG. 4B, a set of water tanks 112 includes three water tanks 142A-C, two of which are arranged in the top row and one of which is arranged below one of the two tanks in the top row. All of the water tanks 142A-C can have the same circular cross sectional shape while at least one of the axial lengths is different, thereby having different capacities. In yet another example as shown in FIG. 4C, a set of water tanks 112 includes four water tanks 144A-D, two 144A and 144B of which are arranged in the top row, one 144C of which is arranged below one of the two tanks in the top row, and one 144D of which is arranged in the middle of two columns along which the other water tanks 144A, 144B, and 144C are arranged. The water tanks 144A, 144B, and 144C can have circular cross sectional shapes and at least one of the water tanks 144A, 144B, and 144C can have a different axial length than the other water tanks so that they have different capacities. The water tank 144D is generally surrounded by the other water tanks 144A, 144B, and 144C and generally has a rectangular cross sectional shape. In yet another embodiment as shown in FIG. 4D, a set of water tanks 112 includes four water tanks 146A-D. The water tanks 146A-D are arranged similarly to the water tanks 144A-D except that the water tank 146C has a longer axial length to have a larger capacity than the water tank 144C. The example configurations of water tanks in FIGS. 4A-4D are only for illustrative purposes, and other variations are also possible with different numbers of rows and columns, different capacities, and different sizes, shapes, lengths, cross sectional shapes, and cross sectional areas.

As illustrated, at least one of the water tanks 112 can be arranged at a different level than the other water tanks 112. In some embodiments, the water tanks 112 can be subgrouped by different levels. For example, in the illustrated examples of FIG. 4C, the first and second water tanks 144A and 144B are arranged at the same level and higher than the other tanks and can thus be designated as being at an upper level (e.g., an upper set of water tanks). The third water tank 144C is arranged at the lowest level and can thus be designated as being at a lower level (e.g., a lower water tank or a lower set of water tanks if multiple water tanks are located at this level). The fourth water tank 144D is arranged generally between the upper level and the lower level and can thus be designated as being at a middle or center level (e.g., a middle water tank or a middle set of water tanks if multiple water tanks are located at this level).

Figure 5:
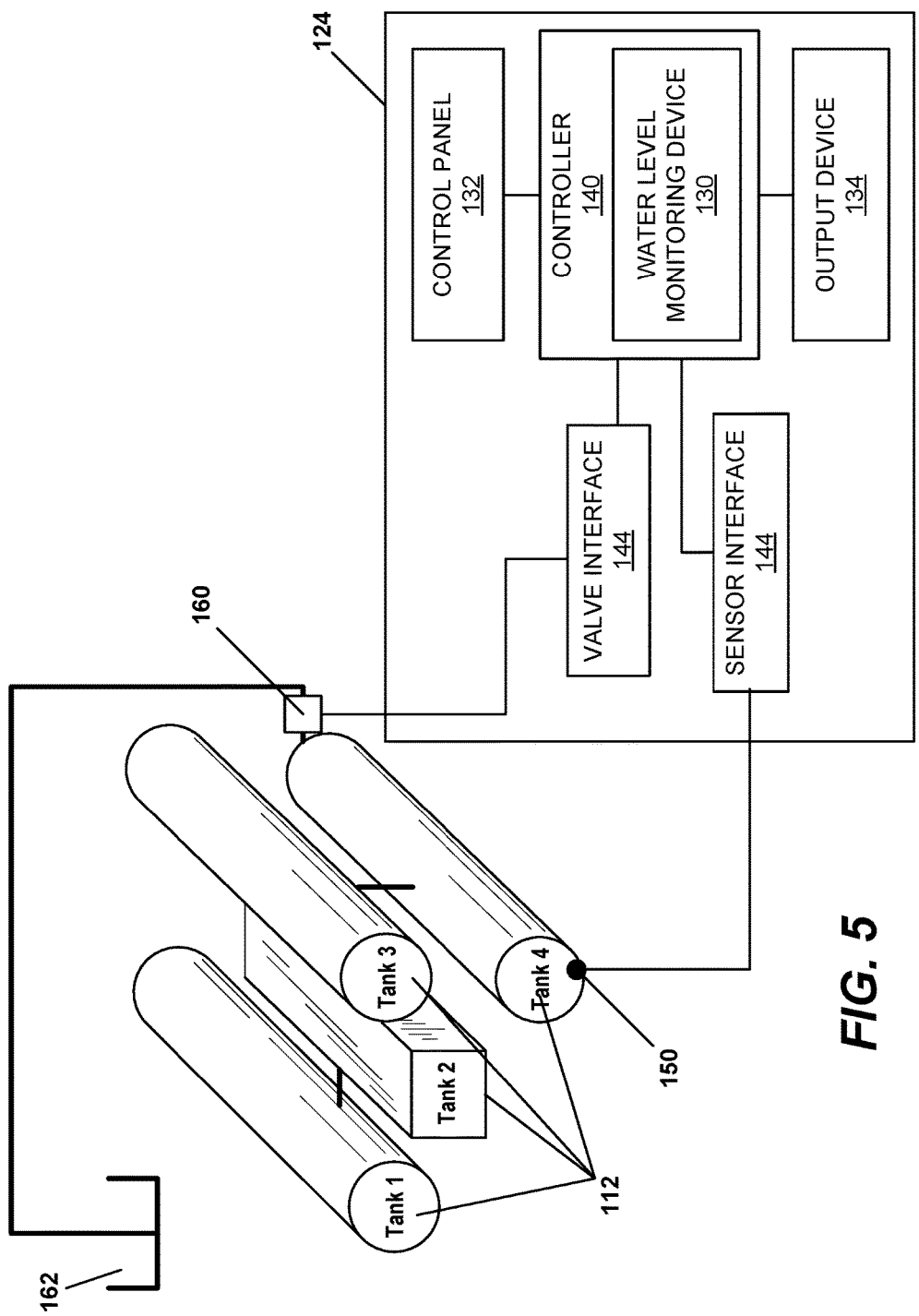
FIG. 5 is an exemplary embodiment of a monitoring device of the vehicle.

In some embodiments, regardless of the configurations of a plurality of water tanks 112, the plurality of tanks 112 are all in fluid communication so that the entire group of tanks 112 operates as a single water tank or single water supply. As illustrated, the group of tanks 112 includes a single inlet 152 that is connected to a water source 162 (FIG. 5). The water source 162 supplies water to the entire group of tanks 112 through the inlet 152. In other embodiments, a plurality of inlets can be provided to the group of tanks 112 for faster filling of water in the tanks.

In some embodiments, the group of tanks 112 includes a single outlet 154 that is connected to the water pump 110. The water contained in the group of tanks 112 is drawn to the water pump 110 through the outlet 154, and the water pump 110 operates to supply water from the group of tanks 112 to the hose 108. In other embodiments, the group of tanks 112 includes a plurality of outlets connected to the water pump 110. Where there is a plurality of outlets connected to the group of tanks 112, the number of outlets can be smaller than the number of tanks 112 so that at least two of the tanks 112 share a common outlet connected to the water pump 110.

As described herein, the monitoring device 124 can use a single sensor 150 for monitoring a water level in the entire group of tanks 112. In some embodiments, the sensor 150 is arranged at the lowest point of the group of tanks 112. For example, the sensor 150 is arranged at the bottom of a water tank that is located lower than the other water tanks in the group. In the illustrated examples of FIGS. 4A-4D, the sensor 150 is located at the bottom of the tank 140D (FIG. 4A), 142C (FIG. 4B), 144C (FIG. 4C), or 146C (FIG. 4D), which is located lower than the other tanks In some embodiments, the sensor 150 is a pressure sensor that reads head pressure of the water contained in the group of tanks 112. If a pressure is arranged higher than the lowest point of the group of tanks 112, the pressure sensor can only read the water level above the sensor. Therefore, by arranging the sensor 150 at the lowest point in the group of tanks 112, the sensor 150 can monitor the pressure from the entire water (or as much water as possible, if not entire) contained in the group of tanks 112.

In other embodiments, the sensor 150 can be arranged at different locations. In one example, the sensor 150 is mounted at a higher point than the bottom of the lowest tank in the group of tanks 112. In other examples, the sensor 150 is arranged at any point of the water circuit. Where the sensor 150 is arranged at other locations than the lowest point of the group of tanks 112, an algorithm for calculating a water level in the group of tanks 112 needs to be modified. For example, the lookup table 230 can be adjusted as the location of the sensor 150 changes.

FIG. 5 is an exemplary embodiment of the monitoring device 124. As described herein, the monitoring device 124 includes the water level monitoring module 130, the control panel 132, and the output device 134. In addition, the monitoring device 124 includes a processing unit 140 that executes the water level monitoring module 130. The processing unit 140 further operates to perform the functionalities of the control panel 132 and the output device 134. The processing unit 140 can be implemented in a way known in the art, including, for example, a processor, a decoder, and an encoder.

The monitoring device 124 can further include a storage unit 146 that includes one or more memories configured to store data associated with the signals and data usable to process the signals. The storage unit 146 can be of various types, including volatile and nonvolatile, removable and non-removable, and/or persistent media. In some embodiments, the storage unit 146 is an erasable programmable read only memory (EPROM).

The processing unit 140 is configured to receive signals from a sensor 150 through a sensor interface 142. The sensor interface 142 enables the processing unit 140 and the sensor 150 to communicate with each other.

As described herein, the group of water tanks 112 can be in fluid communication with each other and provided with a single sensor 150. The sensor 150 is arranged to the group of water tanks 112 and configured to measure one or more characteristics of the group of water tanks 112. In some embodiments, the sensor 150 is configured to detect a water height in the group of water tanks 112. An example method of measuring the water height in the group of water tanks 112 is illustrated in FIGS. 6A and 6B.

The sensor 150 can be of various types. In one example, the sensor 150 can be a pressure sensor configured to detect a water pressure in the group of water tanks 112. The water pressure detected by the sensor 150 can be converted to a water height in the group of water tanks 112. One example of such a pressure sensor is G3 pressure transducer, available from Ashcroft Inc., Stratford, Conn. Other types of sensors are also possible to measure a water height or other characteristics of the water tanks 112.

The processing unit 140 is further configured to control a valve 160 through a valve control interface 144. In some embodiments, a single valve 160 is provided to the group of water tanks 112 to selectively connect a water source 162 to the group of water tanks 112. For example, the valve 160 is arranged between the water source 162 and one of the water tanks 112 in the group while the water tanks 112 in the group are all in fluid communication so that the group of water tanks 112 works as a single large water tank or water source. The valve 160 is engaged with the water tanks 112 and configured to selectively fluidly connect the water tanks 112 with the water source 162. In some embodiments, the processing unit 140 operates to selectively open or close the valve 160 to fill the water tanks 112 from the water source 162. For example, the processing unit 140 detects that a water level in the group of water tanks becomes lower than a threshold, the processing unit 140 controls the valve 160 to open to allow water flow from the water source 162 to the water tanks 112 until the water level reaches a predetermined level.

FIGS. 6A and 6B illustrate a water height in a group of water tanks. As described herein, the water tanks 112 are all connected so as to be in fluid communication. The group of water tanks 112 shares a common outlet 154 through which the water contained in the entire water tanks 112 is discharged. Where the outlet 154 extends from the water tank 112C at the lower level, the water begins being drawn from the water tanks 112A at the upper level and then drawn from the water tank 112B at the middle level, as illustrated in FIG. 6A. As the water is further supplied to the water pump, the water begins being discharged from the water tank 112C at the lower level, as illustrated in FIG. 6B.

The water height H (also referred to herein as a water depth) can be defined as a distance from a reference level R to a water surface WS of the water contained in the group of water tanks 112. As such, the water height H can be measured in the same manner regardless of the configurations and/or arrangements of water tanks in a group.

In the illustrated example, the reference level R is the bottom of the water tank 112C at the lower level (or the lowest point of the group of water tanks). Other reference points or levels can be used as the reference level R. In FIG. 6A, the water is contained at least partially in all of the water tanks 112A, 112B, and 112C, and the water surface WS is formed within the water tanks 112A at the upper level and/or the water tank 112B at the middle level. Therefore, the water height H1 extends to a level of the water tanks 112A and/or the water tank 112B. In FIG. 6B, the amount of water contained in the water tanks 112 is less than the amount of water shown in FIG. 6A, and the water surface WS is formed within the water tank 112C at the lower level. Therefore, the water height H2 extends only to a level of the water tank 112C.

As described herein, the group of water tanks 112 is provided with a single sensor 150 which, for example, can be arranged at the bottom of the water tank 112C at the lower level. Where the sensor 150 is configured as a pressure sensor, the sensor 150 can detect a pressure of the water contained in the group of water tanks 112 as a whole. The water pressure in the group of water tanks is directly related to the water height H in the group of water tanks.

Figure 7:
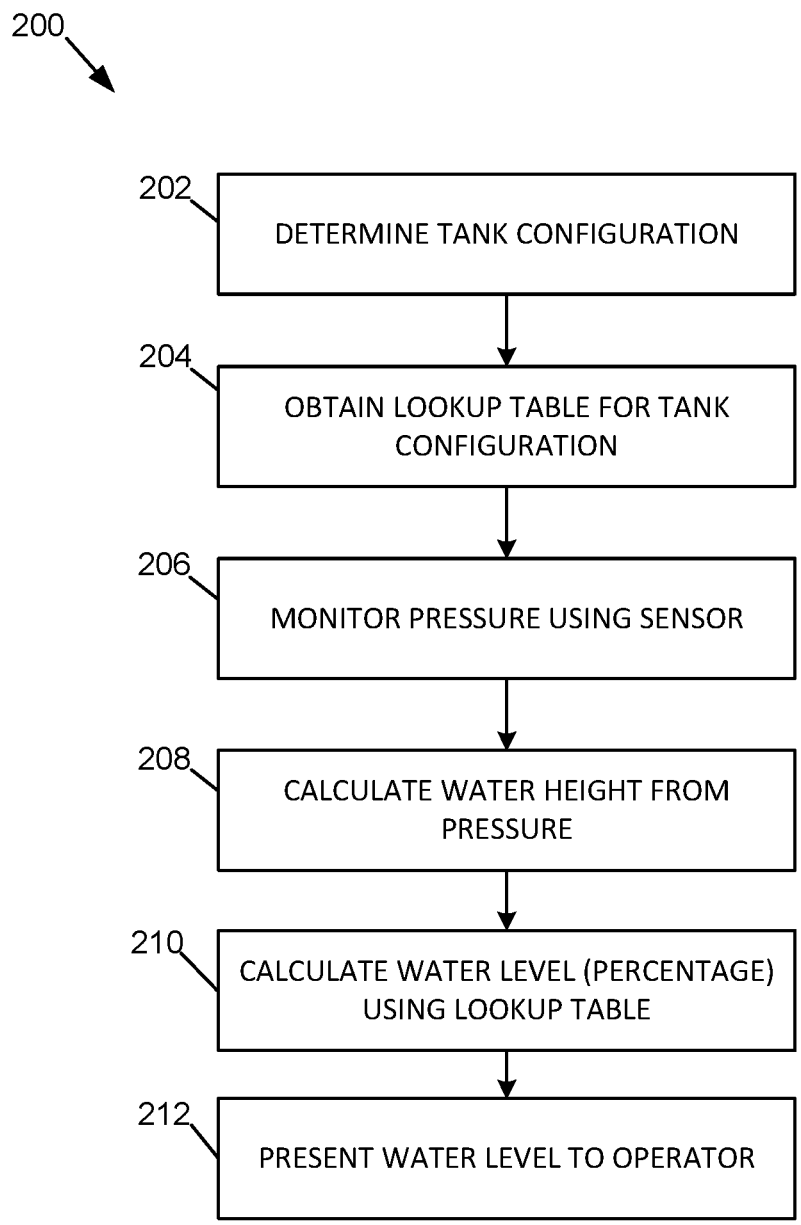
FIG. 7 is a flowchart of an example method for monitoring a water level in a group of water tanks.

FIG. 7 is a flowchart of an example method 200 for monitoring a water level in a group of water tanks. In some embodiments, the method 200 is performed at least partially by the monitoring device 124 (including the water level monitoring module 130). Although the method 200 is primarily described to be performed by the monitoring device 124, other devices can be additionally or alternatively used to perform the method 200.

The method 200 can begin at operation 202 in which the monitoring device 124 operates to determine a tank configuration. For example, the monitoring device 124 obtains information about the group of water tanks 112 that the monitoring device 124 operates to control and/or monitor. In some embodiments, the monitoring device 124 receives a user input of tank capacities. The monitoring device 124 can provide a user interface (e.g., the output device 134) to enable an operator to input capacities for the water tanks. In the example of FIGS. 6A and 6B, the monitoring device 124 can receive a user input of capacities of the water tanks 112A, 112B, and 112C, respectively. In some embodiments, the water tanks 112 can be sub-grouped by different levels, such as the water tanks 112A at the upper level, the water tank 112B at the middle level, and the water tank 112C at the lower level, and the monitoring device 124 is configured to receive a user input of a water capacity for each level. For example, an operator can input a total water capacity of the water tanks 112A in the upper level, a total water capacity of the water tank 112B in the middle level, and a total water capacity of the water tank 112C in the lower level. In other embodiments, other subgrouping of water tanks in a group can be also possible for the purpose of receiving a user input of tank capacities for subsequent calculations.

At operation 204, the monitoring device 124 obtains a lookup table 230 (FIG. 8) for the determined tank configuration. The lookup table 230 is used to convert the water height H in the group of water tanks 112 to a single value of water level. An example of the lookup table 230 is described with reference to FIG. 8.

At operation 206, the monitoring device 124 operates to monitor a pressure of the water in the group of water tanks 112, using the sensor 150. A signal indicative of the water pressure is transmitted from the sensor 150 to the monitoring device 124 for subsequent processes. In some embodiments, the water pressure is continuously monitored. In other embodiments, the water pressure is periodically monitored.

At operation 208, the monitoring device 124 operates to calculate a water height H from the pressure detected at the operation 206. The water pressure is correlated with the water height H in the group of water tanks. For example, the water pressure is directly related with the water height. Accordingly, the water height H can be calculated from the water pressure based on a known relationship between the water pressure and the water height.

At operation 210, the monitoring device 124 operates to calculate a water level in the group of water tanks 112. The water level can be calculated using the water height H and the lookup table 230. In some embodiments, the water level is a single value that represents the remaining water contained in the group of water tanks 112. For example, the water level can be a percent value. In other embodiments, the water level is represented in other formats.

At operation 212, the monitoring device 124 operates to present the calculated water level to the operator. In some embodiments, the water level is presented through the user interface of the system, such as the output device 134. By way of example, as illustrated in FIG. 10, the water level is displayed as a gauge that has a range between Empty (0%) and Full (100%). The water level can be presented to the user in other forms.

As described herein, the output device 134 is used to present information about various operational conditions. Examples of such operational conditions include water flow, pressure, engine speed, vacuum system speed, hose footage, and maintenance conditions. The output device 134 is configured to display the water level together with one or more operational conditions. An example display of the output device 134 is illustrated with reference to FIG. 10.

In the illustrated example, it is primarily described that a pressure sensor is used to measure the water height, from which the water level is calculated. However, in other examples, other methods using other types of sensors can be used to determine the water height and/or the water level. Some examples of such other sensors include an ultrasonic sensor, a capacitive dip tube, a float level sensor, a reed switch, a laser distance sensor, and any other types of sensors suitable for measure the water height.

FIG. 8 illustrates an example lookup table 230 that is used to calculate the water level from the water height. In some embodiments, different lookup tables are provided for different groups of water tanks because the relationship between the water height and the water level can change as the configurations and/or arrangements of water tanks in a group vary. In other embodiments, a single lookup table can be provided to cover multiple groups of water tanks that are different in configuration and/or arrangement. The lookup table 230 can be pre-calculated and stored in the monitoring device 124.

The lookup table 230 includes a tank capacity table 232 that determines the tank capacities (also referred to herein as water capacities) of water tank sets in a group. In the illustrated example, this group of water tanks includes a first tank set 234 ("Tank Set 1"), a second tank set 236 ("Tank Set 2"), and a third tank set 238 ("Tank Set 3"). Each of the tank sets 234, 236, and 238 can include one or more water tanks 112 as a subgroup. By way of example, the first tank set 234 can include one or more water tanks in a lower level (e.g., the water tank 112C in FIGS. 6A and 6B), the second tank set 236 can include one or more water tanks in an upper level (e.g., the water tanks 112A in FIGS. 6A and 6B), and the third tank set 238 can include one or more water tanks in a middle level (e.g., the water tank 112B in FIGS. 6A and 6B).

In some embodiments, the tank capacities for the tank sets can be manually determined. For example, the monitoring device 124 provides a user interface to receive a user input of the tank capacity of each tank set. In other embodiments, the monitoring device can automatically identify the water tanks in the group and determine their capacities based on the given specifications.

The tank capacity table 232 further includes a total tank capacity 240 that sums the tank capacities of all the tank sets.

The lookup table 230 includes a conversion table 242 that converts the water height (H) 244 to the water level 246. The water level 246 is a single value that represents the amount of water contained in the group of water tanks. In this example, the water level 246 is represented as a percent value that ranges between 0% and 100%. Other formats and/or ranges are also possible for the water level 246.

The conversion table 242 includes a percent fill section 248 that associates the water height 244 for the group of water tanks with a percentage of water contained in each of the water tank sets. The percent fill section 248 allows determining a percentage of water in a particular water tank set in the group from the water height 244 of the group of water tanks. In the illustrated example, when the water height 244 is 2 inches, the first tank set 234 is filled with 5.7586% of water, and there is no water contained in the second tank set 236 and the third tank set 238. When the water height 244 is 32 inches, the first tank set 234 is fully filled with water (100%), the second tank set 236 contains no water, and the third tank set 238 contains 10.6667 of water. When the water height 244 is 62 inches, the first and third tank sets 234 and 238 are fully filled with water (100%), the second tank set 236 contains 98.8683% of water.

The conversion table 242 further includes a volume fill section 250 that associates the percentages of water in the water tank sets with the water amount (or volume) in the water tank sets. The volume fill section 250 allows determining the water amount in each of the water tank sets from the percentages in the percent fill section 248. For example, the water amounts in the water tank sets can be calculated by multiplying the percentages in the percent fill section 248 by the tank capacities of the water tank sets.

The water level 246, which is a percent value, is calculated by dividing the water amounts in all the water tank sets by the total tank capacity 240. For example, for each water height 244, the water amounts of all the water tank sets 234, 236, and 238 are added up, and then divided by the total tank capacity 240 to obtain the water level 246 corresponding to that water height 244. In the example of FIG. 8, where the water height 244 is 61 inches, the water level 246 is calculated by adding 368 gallons for the first tank set 234, 586.7898 gallons for the second tank set 236, and 0 gallon for the third tank set 238, and then divided by the total tank capacity of 974 gallons.

Figure 9:
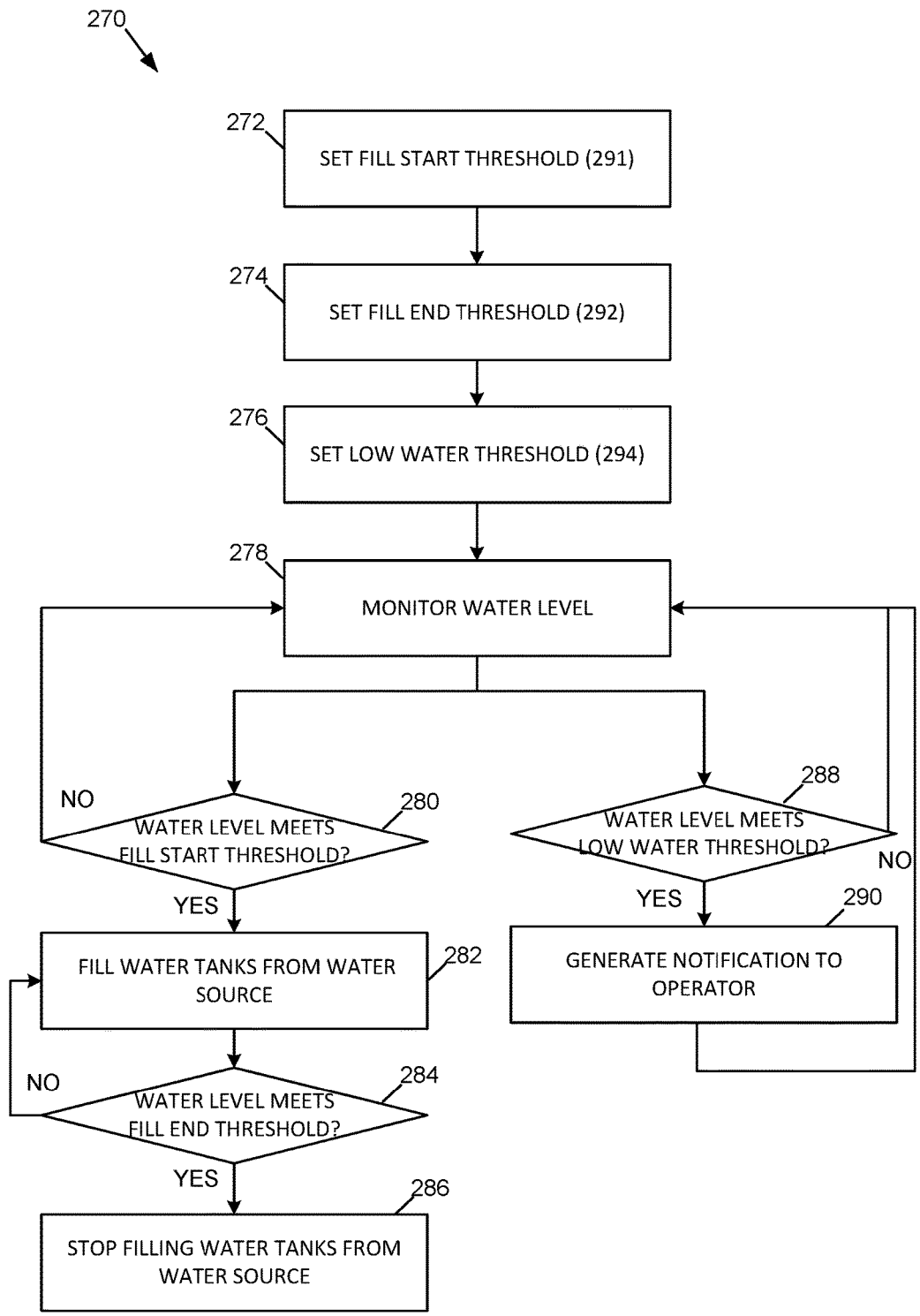
FIG. 9 is a flowchart of an example method for performing the monitoring device.

FIG. 9 is a flowchart of an example method 270 for performing the monitoring device 124. In this method 270, the monitoring device 124 monitors the water level (e.g., a percent value as described herein) and operates to automatically fill the group of water tanks depending on the monitored water level. The monitoring device 124 can further operate to alarm the operator when the water level becomes below a predetermined threshold.

At operation 272, the monitoring device 124 operates to set a fill start threshold 291. The fill start threshold 291 is used to determine when the group of water tanks 112 begins to be filled with water. In some embodiments, the fill start threshold 291 is manually configured by the operator. For example, the monitoring device 124 provides a user interface (e.g., though the display device) that allows the operator to set up a value for the fill start threshold 291. In other embodiments, the fill start threshold 291 is preset by a manufacturer or vendor. In yet other embodiments, the monitoring device 124 can automatically determine the fill start threshold 291.

At operation 274, the monitoring device 124 operates to set a fill end threshold 292. The fill end threshold 292 is used to determine when the water from the water source stops being supplied to the group of water tanks 112. In some embodiments, the fill end threshold 292 is manually configured by the operator. For example, the monitoring device 124 provides a user interface (e.g., though the display device) that allows the operator to set up a value for the fill end threshold 292. In other embodiments, the fill end threshold 292 is preset by a manufacturer or vendor. In yet other embodiments, the monitoring device 124 can automatically determine the fill end threshold 292.

At operation 276, the monitoring device 124 operates to set a low water threshold 294. The low water threshold 294 is used to determine whether the water level in the group of water tanks 112 is below a predetermined level and provides the operator with a notification or warning to that effect. In some embodiments, the low water threshold 294 is used to determine whether the group of water tanks 112 is about to run out of water.

In some embodiments, the low water threshold 294 can be set lower than the fill start threshold 291 and the fill end threshold 292. In other embodiments, the low water threshold 294 is set lower than the fill end threshold 292 and higher than the fill start threshold 291. Other values can be set for the low water threshold 294 in yet other embodiments.

In some embodiments, the low water threshold 294 is manually configured by the operator. For example, the monitoring device 124 provides a user interface (e.g., though the display device) that allows the operator to set up a value for the low water threshold 294. The operator can set the lower water threshold 294 as necessary, or to get as much or as little notification or warning as the operator wants.

In other embodiments, the low water threshold 294 is preset by a manufacturer or vendor. In yet other embodiments, the monitoring device 124 can automatically determine the low water threshold 294.

At operation 278, the monitoring device 124 monitors the water level in the group of water tanks 112. In some embodiments, the method 200 as described in FIG. 7 can be performed for this operation. In other embodiments, other methods can be used to monitor the water level in the group of water tanks 112.

At operation 280, the monitoring device 124 determines whether the water level 246 meets the fill start threshold 291. In some embodiments, it is determined whether the water level 246 is below the fill start threshold 291. If it is determined that the water level 246 meets the fill start threshold 291 (e.g., below the fill start threshold 291) ("YES" at this operation), the method 270 moves on to operation 282. Otherwise ("NO" at this operation), the method 270 returns to the operation 278 in which the monitoring device 124 continues to monitor the water level.

At operation 282, the monitoring device 124 operates to fill the group of water tanks with water. In some embodiments, the monitoring device 124 operates to open the valve 160 (FIG. 5) to fill the group of water tanks 112 from the water source 162.

At operation 284, the monitoring device 124 determines whether the water level 246 meets the fill end threshold 292. In some embodiments, it is determined whether the water level 246 is above the fill end threshold 292. If it is determined that the water level 246 meets the fill end threshold 292 (e.g., above the fill start threshold 292) ("YES" at this operation), the method 270 moves on to operation 286. Otherwise ("NO" at this operation), the method 270 returns to the operation 283 in which the monitoring device 124 continues to operate to fill the group of water tanks with water.

At operation 286, the monitoring device 124 operates to stop filling the group of water tanks with water. In some embodiments, the monitoring device 124 operates to close the valve 160 (FIG. 5) to stop the water from flowing from the water source 162 into the group of water tanks 112.

In addition, at operation 288, the monitoring device 124 can determines whether the water level 246 meets the low water threshold 294. In some embodiments, it is determined whether the water level 246 is below the low water threshold 294. If it is determined that the water level 246 meets the low water threshold 294 (e.g., below the low water threshold 294) ("YES" at this operation), the method 270 moves on to operation 290. Otherwise ("NO" at this operation), the method 270 returns to the operation 278 in which the monitoring device 124 continues to monitor the water level.

At operation 290, the monitoring device 124 generates a notification that the water level in the group of water tanks 112 is below the low water threshold 294. In some embodiments, the notification can be presented through the output device 134. For example, the notification can be displayed as an alarm in the output device 134 using, for example, an icon, symbol, pop-up window, and/or color. Other forms of notification, such as audible alarm, can be also possible. In some embodiments, the notification can be used as a warning to the operator that the water tanks are about to run out of water.

The continuous fill function as performed at operations 272, 274, 278, 280, 282, 284, and 286 can be manually turned on and off by the operator. In some embodiments, the monitoring device 124 provides a user interface (e.g., the output device 134) for the operator to switch on or off the continuous fill mode. Similarly, the low water warning function as performed at operation 276, 278, 288, and 290 can be manually turned on and off by the operator. In some embodiments, the monitoring device 124 provides a user interface (e.g., the output device 134) for the operator to switch on or off the low water warning mode.

FIG. 10 illustrates an example of the output device 134. In this example, the output device 134 includes a display device 296. The display device 296 is configured to include a water level indicator 297 and operational condition indicators 298. In some embodiments, the water level indicator 297 is designed to indicate the water level 246 in the group of water tanks. In the illustrated example, the water level indicator is configured as a water gauge that ranges between Empty (E) and Full (F).

The operational condition indicators 298 are configured to present various operational conditions of the vehicle 100, such as water flow, pressure, engine speed, vacuum system speed, hose footage, and maintenance conditions. As such, the output device 134 is configured to display both the water level 246 (e.g., a percentage) in the group of water tanks and the operational conditions of the vehicle together.

In some embodiments, the display device 296 can be configured as a touch sensitive display screen and incorporate a graphical user interface configured to receive a user input for operating and controlling various elements and devices of the vehicle 100. The graphical user interface can include electronic control elements or widgets.

In some embodiments, the output device 134 includes a physical interface 299 for receiving a user input of operating and controlling various elements and devices of the vehicle 100. The physical interface 299 can include physical control elements, such as buttons, switches, levers, selectors, and joysticks. For example, the valve 160 can be controlled by a user input that is received through the graphical user interface and/or the physical interface 299 of the output device 134.

Figure 11:
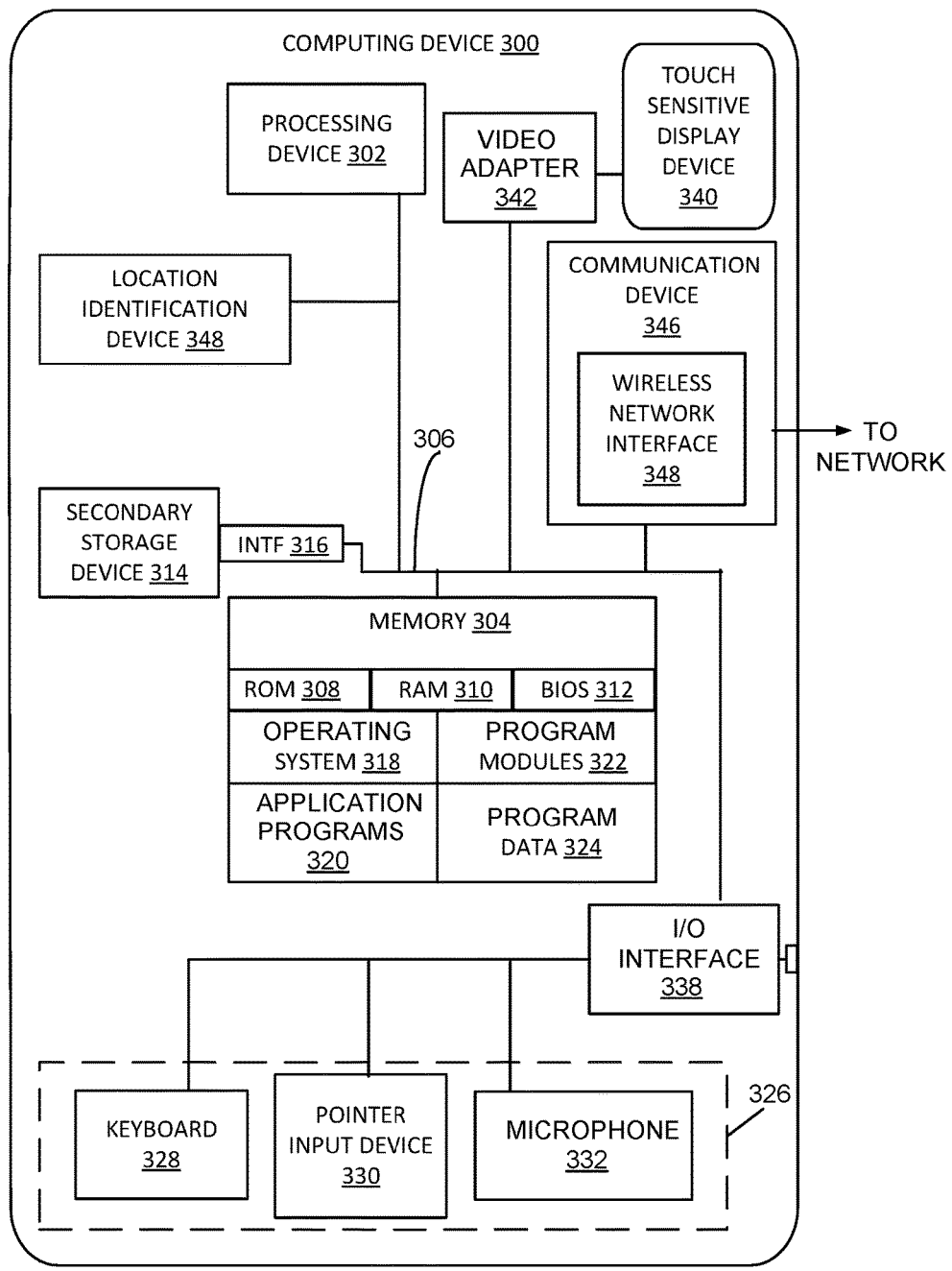
FIG. 11 illustrates an exemplary architecture of a computing device which can be used to implement aspects of the present disclosure.

FIG. 11 illustrates an exemplary architecture of a computing device 300 which can be used to implement aspects of the present disclosure, including the monitoring device 124, and will be referred to herein as the computing device 300. The computing device 300 is used to execute the operating system, application programs, and software modules (including the software engines) described herein. The monitoring device 124 can include all or some of the elements described with reference to FIG. 11, with or without additional elements.

The computing device 300 can be of various types. In some embodiments, the computing device 300 is one or more desktop computers, one or more laptop computers, other devices configured to process digital instructions, or any combination thereof. In other embodiments, the computing device 300 is one or more mobile computing devices. Examples of the computing device 300 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices.

The computing device 300 includes, in some embodiments, at least one processing device 302, such as a central processing unit (CPU) or a programmable logic controller (PLC). A variety of processing devices are available from a variety of manufacturers, for example, Intel or Advanced Micro Devices. In this example, the computing device 300 also includes a system memory 304, and a system bus 306 that couples various system components including the system memory 304 to the processing device 302. The system bus 306 is one of any number of types of bus structures including a memory bus, or memory controller; a peripheral bus; and a local bus using any of a variety of bus architectures.

The system memory 304 includes read only memory 308 and random access memory 310. A basic input/output system 312 containing the basic routines that act to transfer information within the computing device 300, such as during start up, is typically stored in the read only memory 308.

The computing device 300 also includes a secondary storage device 314 in some embodiments, such as a hard disk drive, for storing digital data. The secondary storage device 314 is connected to the system bus 306 by a secondary storage interface 316. The secondary storage devices and their associated computer readable media provide nonvolatile storage of computer readable instructions (including application programs and program modules), data structures, and other data for the computing device 300.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 314 or memory 304, including an operating system 318, one or more application programs 320, other program modules 322, and program data 324.

In some embodiments, the computing device 300 includes input devices to enable a user to provide inputs to the computing device 300. Examples of input devices 326 include a keyboard 328, a pointer input device 330, a microphone 332, and a touch sensitive display 340. Other embodiments include other input devices. The input devices are often connected to the processing device 302 through an input/output interface 338 that is coupled to the system bus 306. These input devices 326 can be connected by any number of input/output interfaces, such as a parallel port, serial port, game port, or a universal serial bus. Wireless communication between input devices and interface 338 is possible as well, and includes infrared, BLUETOOTH® wireless technology, 802.11a/b/g/n, cellular, or other radio frequency communication systems in some possible embodiments.

In this example embodiment, a touch sensitive display device 340 is also connected to the system bus 306 via an interface, such as a video adapter 342. The touch sensitive display device 340 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 340, the computing device 300 can include various other peripheral devices (not shown), such as speakers or a printer.

The computing device 300 further includes a communication device 346 configured to establish communication across the network. In some embodiments, when used in a local area networking environment or a wide area networking environment (such as the Internet), the computing device 300 is typically connected to the network through a network interface, such as a wireless network interface 350. Other possible embodiments use other wired and/or wireless communication devices. For example, some embodiments of the computing device 300 include an Ethernet network interface, or a modem for communicating across the network. In yet other embodiments, the communication device 346 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 300 typically includes at least some form of computer-readable media. Computer readable media includes any available media that can be accessed by the computing device 300. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 300. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 11 is also an example of programmable electronics, which may include one or more such computing devices, and when multiple computing devices are included, such computing devices can be coupled together with a suitable data communication network so as to collectively perform the various functions, methods, or operations disclosed herein.

Referring again to FIG. 11, the computing device 300 can include a location identification device 348. The location identification device 348 is configured to identify the location or geolocation of the computing device 300. The location identification device 348 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A sewer cleaning vehicle comprising:
   a plurality of water tanks being in fluid communication with one another and having a single outlet connected to a water pump;
   a sensor engaged with the plurality of water tanks and configured to measure a water height in the plurality of water tanks; and
   a monitoring device including:
      a processing unit configured to calculate a water level in the plurality of water tanks based on the water height; and
      a display device configured to display the water level;
   wherein the sensor includes a pressure sensor.

2. The sewer cleaning vehicle of claim 1, wherein the processing unit is configured to:
   obtain a lookup table for the plurality of water tanks; and
   calculate the water level based on the lookup table and the water height.

3. The sewer cleaning vehicle of claim 1, wherein the water level is represented as a single value.

4. The sewer cleaning vehicle of claim 3, wherein the single value is a percent value.

5. The sewer cleaning vehicle of claim 1, wherein the water level is displayed in the display device along with operational conditions of the vehicle.

6. The sewer cleaning vehicle of claim 1 further comprising:
   a vehicle bed;
   a debris tank configured to collect debris from a sewer pipe; and
   the water pump, the water pump configured to supply water from the plurality of water tanks.

7. The sewer cleaning vehicle of claim 1, wherein at least one of the plurality of water tanks has a different dimension than the other water tanks.

8. The sewer cleaning vehicle of claim 1, wherein at least one of the plurality of water tanks is arranged at a different level than the other water tanks.

9. The sewer cleaning vehicle of claim 1, wherein the monitoring device is configured to:
   determine whether the water level is below a fill start threshold; and
   upon determining that the water level is below the fill start threshold, operate to fill the plurality of water tanks with water.

10. The sewer cleaning vehicle of claim 9, wherein the monitoring device is configured to:
    receive a user input of the fill start threshold.

11. The sewer cleaning vehicle of claim 1, wherein the monitoring device is configured to:
  determine whether the water level is above a fill end threshold; and
  upon determining that the water level is above the fill end threshold, operate to stop filling the plurality of water tanks with water.

12. The sewer cleaning vehicle of claim 11, wherein the monitoring device is configured to:
  receive a user input of the fill end threshold.

13. The sewer cleaning vehicle of claim 1, wherein the monitoring device is configured to:
  determine whether the water level is below a low water threshold; and
  upon determining that the water level is below the low water threshold, generate a notification to inform an operator that the water level is below the low water threshold.

14. The sewer cleaning vehicle of claim 13, wherein the monitoring device is configured to:
  receive a user input of the low water threshold.

15. The sewer cleaning vehicle of claim 13, wherein the notification is displayed in a display device of the monitoring device.

16. A method for monitoring a water volume in a plurality of water tanks mounted in a sewer cleaning vehicle, the plurality of water tanks being in fluid communication with one another and having a single outlet connected to a water pump, the method comprising:
  monitoring a water height in the plurality of water tanks;
  calculating a water level based on the water height; and
  displaying the water level using a display device;
  wherein monitoring a water height includes:
    monitoring a water pressure in the plurality of water tanks using a pressure sensor; and
    calculating the water height based on the water pressure.

17. The method of claim 16, wherein the water level is represented as a single percent value.

18. The method of claim 16 further comprising:
  obtaining a lookup table for the plurality of water tanks;
  wherein calculating a water level is based on the lookup table and the water height.

19. The method of claim 16, further comprising:
  determining whether the water level is below a fill start threshold;
  upon determining that the water level is below the fill start threshold, operating to fill the plurality of water tanks with water;
  determining whether the water level is above a fill end threshold;
  upon determining that the water level is above the fill end threshold, operating to stop filling the plurality of water tanks with water;
  determining whether the water level is below a low water threshold; and
  upon determining that the water level is below the low water threshold, generating a notification to inform an operator that the water level is below the low water threshold.

20. The method of claim 19, further comprising:
  receiving a user input of the fill start threshold, the fill end threshold, and the low water threshold.

* * * * *

UNITED STATES PATENT AND TRADEMARK OFFICE
CERTIFICATE OF CORRECTION

PATENT NO. : 10,436,624 B2
APPLICATION NO. : 15/684689
DATED : October 8, 2019
INVENTOR(S) : Jared James Brodbeck Page 1 of 1

It is certified that error appears in the above-identified patent and that said Letters Patent is hereby corrected as shown below:

In the Specification

At Column 10, Line 57: delete "10.6667" and insert --10.6667%--

Signed and Sealed this
Sixth Day of April, 2021

Drew Hirshfeld
*Performing the Functions and Duties of the
Under Secretary of Commerce for Intellectual Property and
Director of the United States Patent and Trademark Office*